Oct. 30, 1962   J. R. ALDRICH   3,060,623
ANIMAL TRAP
Filed July 18, 1960
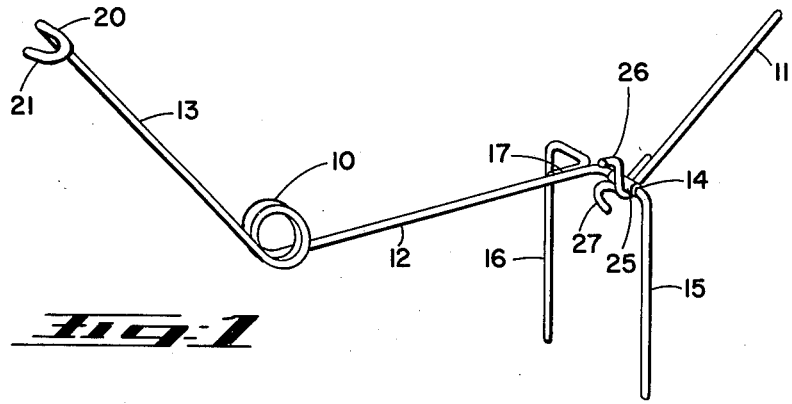
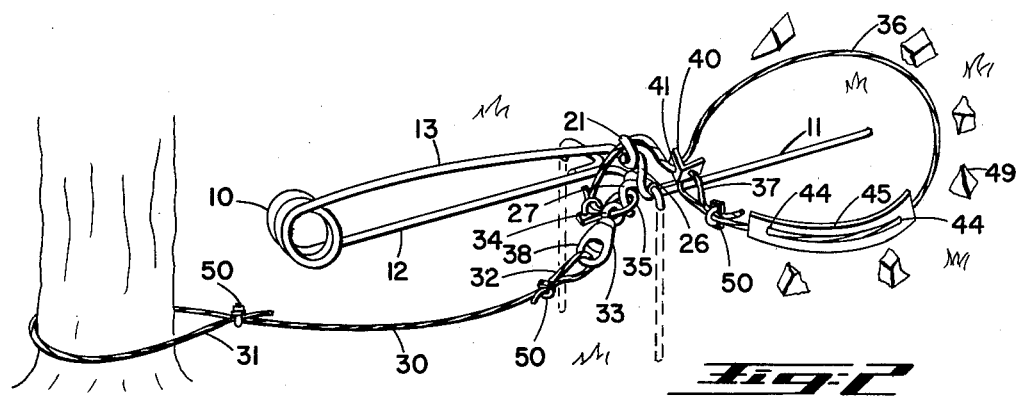
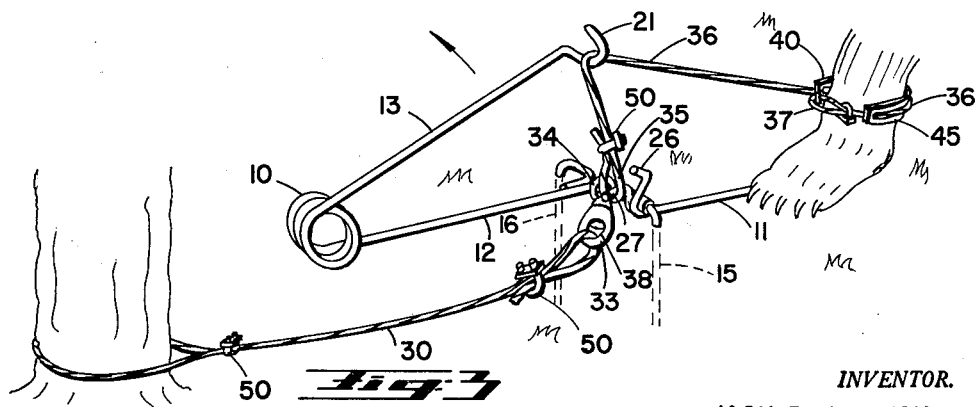
INVENTOR.
JACK R. ALDRICH
BY
Lee R. Schermerhorn
ATTORNEY

United States Patent Office 3,060,623
Patented Oct. 30, 1962

3,060,623
ANIMAL TRAP
Jack R. Aldrich, Castle Rock, Wash.
Filed July 18, 1960, Ser. No. 43,596
4 Claims. (Cl. 43—87)

This invention relates to an improved snare trap for animals.

While the application of the invention is not limited to any particular size or kind of animals, it is intended primarily as an humane leg hold snare for large animals such as bear. It may also be made in sizes appropriate for smaller animals such as coyotes and mink.

There is a great need for an humane trap for all such animals and particularly in settled areas where horses, cows, dogs and even people may be caught instead of the animals intended. Also, it is often desired to hold the trapped animal with a minimum amount of harm as, for example, in the case of bears in certain localities where they may not lawfully be killed but are trapped merely for the purpose of moving them to other regions farther away from human habitation. The traps presently available do not satisfactorily meet the requirements for such uses. Some types of snares heretofore proposed are effective in catching the animal but include major parts that are either severely damaged or substantially destroyed by a large animal so that they must be repaired or replaced after each use. The large animal traps heretofore proposed have also generally been very heavy and bulky thereby limiting the number which could be carried by a trapper on foot.

The general object of the present invention is, therefore, to provide an improved snare to overcome the objections and disadvantages mentioned above.

Another object is to provide an improved humane trap of simple and inexpensive construction which is relatively small and light in weight when made in sizes appropriate for large and powerful animals.

Another object is to provide an improved leg hold snare.

Another object is to provide a trap of the type described which is so constructed that it will not be severely damaged by a large animal.

The present trap comprises a wire rope snare and a spring device equipped with a trigger for throwing the loop of the snare upward on the leg of the animal and simultaneously tightening the loop. In order to minimize weight and material, the usual base and frame parts are eliminated and the spring and trigger mechanism are carried by a simple spike member which may be pushed into the ground to support the moving parts in operative position. The snare is not attached to this mechanism but is merely laid loosely thereover so that when the trap is sprung, the animal is immediately free of the trap mechanism and is thereby less likely to damage it. Thus, the whole assembly is light in weight and small in bulk, permitting the trapper to carry a larger number of the traps when he is travelling on foot.

The trap mechanism is preferably fabricated from steel rods which are ordinarily not damaged by the animal beyond a degree of bending which may be readily repaired by the trapper in the field. The present trap, even when somewhat damaged, may usually be made immediately available for re-use without requiring workshop repair or replacement.

The foregoing and other objects and advantages will become apparent and the invention will be more readily understood from the following description of a preferred embodiment which is illustrated on the accompanying drawing. Various changes may be made, however, in the construction and arrangement of parts and all such modifications within the scope of the appended claims are included in the invention.

In the drawing:

FIGURE 1 is a perspective view of the spring and trigger mechanism of the present trap in sprung position;

FIGURE 2 is a perspective view showing the spring and trigger mechanism set and the snare placed for catching an animal; and FIGURE 3 is a similar view showing the action of the trap in catching an animal.

The operating mechanism of the trap as shown in FIGURE 1 comprises a spring 10 and a trigger 11 both formed of steel rods. To obtain the desired spring action, the spring rod is coiled as shown intermediate its ends providing a lower straight arm 12 and an upper straight arm 13. The arm 12 has a bearing portion 14 bent horizontally at right angles and a spike extremity portion 15 bent vertically at right angles. A second spike 16 is welded onto the arm 12 at 17. The extremity of arm 13 has a detent portion 20 bent horizontally at right angles to the arm with the rod continuing in a U-shaped bend or open loop 21 which is disposed in a vertical plane when the trap is set as shown in FIGURE 2. FIGURE 1 shows arm 13 in its normal relaxed position after the trap has been sprung.

The rod forming the trigger 11 is welded to a tubular sleeve 25 which is pivotally mounted on the bearing portion 14 of spring arm 12 at the upper end of spike leg 15. The trigger further includes an upstanding and rearwardly projecting hook or catch 26 which is engageable with detent 20 of spring arm 13 to hold the spring in set position. A lower hook 27 is welded to sleeve 25 and trigger 11 for a purpose to be presently described.

The snare includes a length of wire rope 30 having a loop or eye 31 in one end for securing the rope to a tree or drag. The other end is equipped with a loop or eye splice 32 attached to one end of a swivel connector 33. On the other end of the swivel connector is an eye 34 which in the present instance is smaller than eye 38. Eye 34 is connected with an eye 35 in one end of the snare loop 36 which also is formed of a short length of flexible wire rope. The snare loop has an eye 37 in its other end connected with an aperture in one leg of an angle iron 40. The other leg of angle iron 40 is equipped with a circular aperture 41 which loosely receives the rope 36.

Angle iron 40 forms a jam lock which will slide freely along the rope in a direction to contract the noose but will not slide in the opposite direction to enlarge the noose when the rope is under tension. When the rope is tensioned, the aperture 41 is pulled to a position with its axis oblique to the axis of the rope passing therethrough creating a binding action which locks the angle iron against sliding movement in a direction toward the eye end 35. If desired, the wire rope of the noose may be threaded through apertures 44 in the ends of a short length of flat leather strap 45 to prevent the wire from cutting into the animal's leg.

The trap is set by pressing the spikes 15, 16 into the ground adjacent a spot where the animal will be likely to step and the animal may be induced to place his foot in such spot by arranging rocks 49 or other obstacles around the spot. Spikes 15 and 16 are pressed into the ground substantially their full length so that when spring arm detent 20 is engaged under trigger catch 26, the trigger arm 11 will project over the desired spot in approximately horizontal position at ground level. A depression is formed in the ground under the trigger arm to provide space for ample downward movement for release.

The snare is then arranged as shown in FIGURE 2 with a portion of the snare rope between angle iron 40 and eye 35 laid in the U-bend 21 of the upper spring arm alongside the trigger catch 26. Hook 27 is engaged in either the rope eye 35 or the large swivel eye 38 and the rope 30 is suitably disposed and anchored to a tree or drag. Trigger arm 11 and the depression thereunder are then covered with leaves and, if desired, the snare loop 36 and, in some cases, the whole trap, may be so covered to conceal it. It will be appreciated that when the trap is set, the lower spring arm 12 is substantially on ground level and upper spring arm 13 is only slightly above ground level whereby no part of the trap projects upward a substantial distance.

The direction of the animal's approach is usually known so when strap 45 is employed, the snare is arranged so that this strap will contact the rear side of the animal's leg where the blood vessels lie near the surface. Strap 45 thereby tends to prevent stoppage of circulation of blood in the animal's foot during the time the animal is held by the snare.

When the animal steps on trigger arm 11, the downward pivotal movement of this arm on bearing portion 14 causes catch 26 to release the spring arm detent 20, allowing the spring arm 13 to rise throwing the snare loop upward on the animal's leg and then tightening the noose as the U-bend 21 tensions the rope between the animal's leg and hook 27 as shown in FIGURE 3. Hook 27 does not release the eye 35 as long as spikes 15 and 16 are in the ground because the trigger arm will not depress far enough to elevate hook 27 to release position.

The first efforts of the animal to escape pull the spikes 15 and 16 out of the ground disengaging the ropes and swivel from hook 27 whereby the snare is then completely free of the spring and trigger mechanism. Any further attempts of the animal to free itself do not involve this mechanism and the mechanism ordinarily is not damaged.

Even though the spring and trigger mechanism may be trampled upon, it is usually not damaged because of the spring steel employed and may be reset without requiring shop repair. If snare rope 36 is damaged, it may be replaced at slight expense. Swivel 33 usually prevents kinking of anchor rope 30 whereby this rope is seldom damaged. Preferably, all the rope eyes are formed by bolted clamps 50 so that the only tool needed for replacing ropes in the field is a common nut wrench.

Whereas the steel jaw traps ordinarily used for bears are inhumane and dangerous and often in the larger sizes cannot be released by a strong man held therein, the present trap is substantially safe and painless and can be released easily by a child without appreciable muscular effort.

Having now described my invention and in what manner the same may be used, what I claim as new and desire to protect by Letters Patent is:

1. An animal trap comprising a wire rope snare having an eye in one end, an anchor rope connected to said snare rope, a spring and trigger mechanism formed of metal rods, a releasable temporary anchor for said snare comprising a hook on said trigger mechanism engageable in said eye, and an arm on said spring slidably engageable with said snare rope between said eye and the loop of the snare to tighten said loop when said spring arm is released by said trigger mechanism.

2. A spring and trigger mechanism for a snare trap comprising a spring metal rod having a vertical spike end portion adapted to be pressed into the ground, a bend in said rod at the upper end of said spike portion forming a horizontal trigger bearing portion, a bend in said rod at said bearing forming a lower spring arm extending horizontally at right angles to said horizontal portion, said rod continuing through a coiled configuration and thence into an upper spring arm comprising the other end portion of said rod, and a second metal rod forming a trigger arm and catch for said upper spring arm, said second rod being pivotally mounted on said trigger bearing portion of said first rod.

3. In a mechanism as defined in claim 2, a temporary snare anchor comprising a hook on said trigger arm rod adjacent to said catch.

4. In a mechanism as defined in claim 2, a second spike portion comprising a metal rod welded to said lower spring arm.

References Cited in the file of this patent
UNITED STATES PATENTS

| | | |
|---|---|---|
| 1,802,918 | Kleffman | Apr. 28, 1931 |
| 1,860,378 | Bailey | May 31, 1932 |

FOREIGN PATENTS

| | | |
|---|---|---|
| 3,132 | Great Britain | Apr. 21, 1910 |
| 108,746 | Great Britain | Aug. 23, 1917 |
| 397,268 | Great Britain | Aug. 24, 1933 |
| 514,451 | Great Britain | Nov. 8, 1939 |